United States Patent Office 3,218,258
Patented Nov. 16, 1965

3,218,258
DISPERSANT COMPOSITIONS
La Verne N. Bauer, Cheltenham, and Albert F. Preuss, Willow Grove, Pa., assignors to Rohm & Haas Company, Philadelphia, Pa., a corporation of Delaware
No Drawing. Filed Nov. 14, 1962, Ser. No. 237,743
10 Claims. (Cl. 252—51.5)

This invention concerns compositions comprising an oil having dissolved therein a minor proportion of a copolymer having N-substituents of the structure

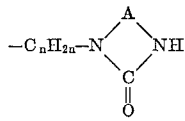

wherein $n$ is an integer of two to three and A is an alkylene group of two to three carbon atoms, said N-substituent groups being attached to amide nitrogen of an oil-soluble copolymer.

Reaction of an aminoalkyl 2-imidazolidinone or hexahydro-2-pyrimidinone with the carboxy function in a polymer prepared with maleic anhydride, itaconic anhydride, or related anhydride of an ethylenically unsaturated dicarboxylic acid is shown in United States Patent No. 2,980,652. The polymers therein described are proposed for use as coating materials and textile assistants. Such copolymers prepared with a proportion of long chained groups from polymerizable monomers sufficient to provide solubility in hydrocarbon fluids and from maleic or itaconic anhydride can be reacted with an aminoalkyl compound of the formula

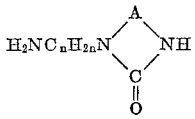

to provide an amide linkage from the primary nitrogen at a carboxy group of the anhydride mer. The other carboxy group usually becomes a carboxylic acid group or if excess of the aminoalkyl reactant is used, this acid group can be carried to a salt form or if the reaction mixture is further heated some or all of the latter groups form imide groups. The resulting copolymers, it has now been found can be dissolved in mineral oils or synthetic lubricants to improve various properties thereof. It has further been found that when the copolymers are formed by graft polymerizing an olefinic anhydride onto an oil-soluble base polymer and reacting the resulting graft copolymer with a said aminoalkyl compound, the resulting nitrogenous copolymers are more effective in one or more respects and are more stable in oils than are the copolymers prepared as shown in the above-noted patent.

The method of preparing graft copolymers by the delayed catalized grafting of maleic or itaconic anhydride and like anhydrides to an oil-soluble addition polymer has been described in application Serial No. 221,306, filed on Sept. 4, 1962, by Dr. La Verne N. Bauer, in the hands of a common assignee.

These graft copolymers are prepared by first polymerizing at least one monoethylenically unsaturated monomer until 50% to 90% thereof has formed polymer under the influence of a free radical initiator, the average carbon content of the polymerizing material being sufficient to supply solubility of the final copolymer in oils, whereby a base polymer is formed, mixing with said base polymer maleic and/or itaconic anhydride, and graft copolymerizing therewith, the anhydride used being 1% to 10% of the weight of monomers. The most important starting monomers are alkyl acrylates and methacrylates. While the alkyl portion thereof may vary from methyl through octyl, dodecyl, and octadecyl to tetracosyl, the average size of the alkyl portion should be sufficient to supply oil-solubility of the graft copolymers to be formed. In addition to acrylic esters there may be used dialkyl itaconates or fumarates or vinyl alkanoates and mixtures of such esters. Minor proportions of other polymerizable unsaturated monomers may be used as comonomers, such as styrene, vinyltoluene, p-chlorostyrene, vinyl ethers such as vinyl butyl ether, vinyl dodecyl ether, vinyl ethyl thioether, or vinyl tetradecyl thioether, acrylic amides such as N-methylmethacrylamide, N,N-dimethylacrylamide, N,N-dibutylmethacrylamide, N-phenylacrylamide, acrylonitrile, methacrylonitrile, N-vinyl-2-pyrrolidinone, N-vinylcaprolactam, N-vinyloxazolidinone, N-acryloyloxyethylpyrrolidinone, or other monovinylidene monomers, including acrylic esters of monohydric alcohols with groups containing cycles or heteroatoms. Typical esters containing cycles are phenyl, benzyl, tetrahydrofurfuryl, cyclohexyl, methylcyclohexyl, trimethylcyclohexyl, butylcyclohexyl, or terpinyl acrylate or methacrylate. Some typical esters having a heteroatom in the alcohol residue include methoxyethyl, butoxyethyl, octoxyethyl, butoxyethoxypropyl, ethoxyethoxyethyl, benzoxyethyl, cyclohexoxyethyl, phenoxyethyl, butylphenoxyethyoxyethyl, octylphenoxyethoxyethoxyethyl, and similar polyethoxy groups, tetradecylthioethyl, octylthiopropyl, dimethylaminoethyl, diethylaminoethyl, or tert-butylaminoethyl acrylate or methacrylate. Similar itaconates or fumarates may also be used.

The starting monomer or mixture of monomers is polymerized between 50° C. and 150° C. under the influence of a free radical polymerization initiator such as benzoyl peroxide, acetyl peroxide, lauroyl peroxide, tert-butyl perbenzoate, dibutyl perphthalate, diisopropylbenzene hydroperoxide, cumene hydroperoxide, tert-butyl hydroperoxide, azodiisobutyronitirle, azodiisobutyramide, dimethylazodiisobutyrate, or azobis($\alpha$-methylbutyronitrile). Activators and/or promotors may be used in conjunction with the free radical polymerization catalysts. Polymerization is most conveniently effected in a solvent such as benzene, toluene, xylene, petroleum oil, butyl acetate, dioctyl sebacate, tributyl phosphate, or a chlorinated hydrocarbon. When 50% to 90% of the starting monomer or monomers have been polymerized, polymer and anhydride are mixed and polymerization is continued. The maleic or itaconic anhydride is best dissolved in a solvent or in a monomer before being mixed with base polymer. There results graft copolymer having a base polymer of at least one polymerizable monoethylenically unsaturated ester supplying an oil-solubilizing group, said base polymer having grafted thereon units from maleic or itaconic anhydride in an amount of about 1% to 10% of the weight of the comonomers used.

It has now been discovered that these copolymers can be usefully modified by reaction at the anhyride groups with an aminoalkyl compound as defined herein and that the resulting copolymers may be dissolved in oils to provide compositions of good dispersing action. In oils used for lubrication such action prevents deposition of gums and lacquers, while in oils used to provide heat or power the resulting compositions are stabilized against formation of sludge and deposits. Thus copolymers grafted with anhydride units modified to amide groups are highly effective dispersants and detergents in oil systems. At the same time they can be used to improve viscosity-temperature relations and, if desired, to depress pour points. In gasolines, jet fuels, and fuel oils they improve conductivity and provide safer handling.

The graft copolymers formed with anhydride are reacted with an aminoalkyl compound of the formula

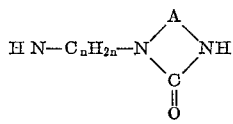

where $n$ and A have the meanings given above, between about 80° and 200° C., preferably 100° and 160° C. When the graft copolymer contains units which are sensitive to aminolysis, it is preferred to operate in the lower part of this temperature range, but this reaction does not detract from the value of the copolymers. The amount of the aminoalkyl compound used is proportioned to the anhydride units.

Molar proportions from about 0.5:1 to 2:1 for aminoalkyl compound to anhydride group are used. Unreacted aminoalkyl compound can be removed as by filtration. The products formed may be regarded as oil-soluble copolymers carrying amic acid units on a base polymer. The amic acid units compose about 1% to about 22% by weight of the final graft copolymer with the range of 2% to 11% being preferred.

If the graft copolymers with amic acid groups are prepared in a volatile solvent, they may be handled, stored, and shipped as concentrates which are then mixed with the fluid in which they are to be used. On the other hand, a volatile solvent may be displaced with a non-volatile or but slightly volatile solvent. Thus, a graft copolymer prepared in toluene may be transferred to lubricating oil or synthetic lubricant by mixing the solvent solution of graft copolymer and oil or synthetic lubricant and heating the mixture, desirably under reduced pressure. Temperatures from 100° to 175° C. may be used with pressures from normal to a few millimeters of mercury.

Compositions of this invention are prepared by dissolving about 0.001% to 20% of one or more of the amide-containing copolymers in an oil. The copolymer may be the sole additive or it may be used in conjunction with other additives. These include anti-oxidants, stabilizers, anti-wear agents, anti-foam agents, heavy duty detergents, pour point depressants, viscosity index improvers, corrosion inhibitors, oiliness agents, extreme pressure agents, anti-squawk agents, and other types of additives.

Typical of these are 4,4'-methylenebis-2,6-di-tert-butylphenol, trialkylphenols, tris(dimethylaminomethyl)-phenol, phenothiazine, naphthylamines, N'-sec-butyl-N,N-dimethyl-p-phenylenediamine, zinc, barium, or nickel dialkyldithiophosphates, calcium, strontium, or barium petroleum sulfonates, alkaline earth alkylphenates, alkaline earth salicylates, calcium phenylstearate, tricresyl phosphate, silicones, alkylphenol-alkylene oxide condensates, alkenylsuccinic anhydrides, sulfurized sperm oil, sulfurized terpenes, polyisobutylenes, polymers of acrylic esters, copolymers of dialkyl fumarates and vinyl acetate, or copolymers of acrylic esters and polar monovinylidene compounds such as N-vinyl-2-pyrrolidinone, vinylpyridines, aminoalkyl acrylates or methacrylates, or polyethyleneglycol acrylic esters.

As carriers of the graft copolymers having amide groups substituted with a keto imidazolinyl- or hexahydropyrimidyl-alkyl group there may be used a lubricating oil of mineral or synthetic origin or a combustible fluid. Lubricating oils of petroleum origin vary in viscosity from spindle oils to motor oils to reciprocating aircraft engine oils to gear oils. They include hydraulic fluids, automatic transmission fluids, and greases. Synthetic lubricants include esters, polyethers, and silicone fluids. The use of polyethylene glycols with ether or ester units in terminal positions is well known, as also the use of such esters as dioctyl sebacate or azelate, tributyl phosphate, and silicate esters. In lubricating oils, whether natural or synthetic, the amount of graft copolymer used is usually from about 0.1% to 10%, and is preferably from about 0.5% to 5%.

Further details of preparation of the amide-bearing graft copolymers and compositions utilizing them are given in the following illustrative examples. Parts therein are by weight unless otherwise indicated.

EXAMPLE 1

(a) Apparatus is prepared from a round-bottom, 3-necked flask equipped with gas inlet tube, reflux condenser, stirrer, thermometer, and addition funnel. The apparatus is flushed with nitrogen. There are mixed 90 parts of cetyl-stearyl methacrylate, 122 parts of lauryl-myristyl methacrylate of 98% purity, 15 parts of white mineral oil, and 1.5 parts of a 50% diisopropylbenzene hydroperoxide solution in alcohol and ketone. About 30% of the mixture is charged to the flask and 0.3 part of a 25% solution of diisobutylphenoxy-ethoxyethyldimethylbenzylammonium chloride monohydrate in n-hexanol is added. The charge is heated to 105° C. and maintained thereafter at about this temperature. Time is counted from the time the temperature reaches 105° C. After 20 minutes with heating and stirring, additions of mixture are begun, all mixture being introduced at the end of the first two hours. Polymerization is then found to be about 70% complete. From 2.25 to 3.0 hours after start of polymerization a mixture of 9 parts of maleic anhydride, 81 parts of ethyl acrylate, 0.45 part of 50% diisopropylbenzene hydroperoxide solution, and 0.09 part of 25% solution of the above quaternary ammonium salt is slowly added to the base polymer and copolymerized therewith. At 3.67 hours there are added 0.3 part of the 50% hydroperoxide solution, 0.06 part of the 25% quaternary solution, and 150 parts of white oil. From time to time small amounts of these three materials are supplied for totals of 1.8, 0.36, and 60 parts each. At 7.5 hour 200 parts of oil is added. The mixture is heated to 135° C. at 5 mm. (Hg) pressure for a half hour. The resulting solution of graft copolymer is further diluted with oil to a polymer concentration of 30%. This sololution has a viscosity of 208 cs. at 210° F.

(b) There are mixed 450 parts of the above oil solution of graft copolymer and 5 parts of N-β-aminoethyl-ethyleneurea. This mixture is stirred and heated under nitrogen for four hours at 120° C. A filter aid is mixed therewith and the mixture is filtered. The grafted anhydride units react to form amic acid units in which the amide nitrogen carries the group

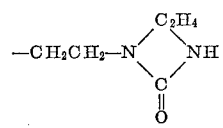

The oil solution of this graft copolymer has a viscosity of 3.05 cs. at 210° F.

(c) A part of this solution is mixed with 170 S.U.S. midcontinent solvent extracted mineral oil and a blend containing 1% of graft copolymer prepared. It has a viscosity of 6.53 cs. at 210° F. and of 41.73 cs. at 100° F. with a viscosity index of 117.

Another part of the above concentrate is mixed with 170 S.U.S. neutral oil to give a blend containing 2% of copolymer. This bleed disperses asphaltenes in the standard test at both 90° C. and 150° C. Upon successive dilutions it is found that 0.2% of asphaltenes is dispersed at both 90° and 150° C. even when the graft copolymer content is as low as 0.0625%. At 150° C. dispersancy is obtained with 0.0625% of graft copolymer with 0.4% of asphaltenes. Dispersancy is considerably increased by reacting the anhydride units with an aminoalkylalkyl-eneurea.

Another blend is prepared by mixing the above concentrate with 100 S.U.S. neutral oil to a concentration of 1% of graft copolymer. This blend has a pour point of −25° F. (A.S.T.M.). The neutral oil without copolymer has a pour point of 5° F.

In a C.R.C. FL–2 engine test a blend containing 1% of the above graft copolymer gives a sludge rating of 67.4 and a varnish rating of 15.1 for a total rating of 82.5. This oil also contained 1% of zinc dialkyldithiophosphate and the oil with this additive gives ratings of 46.8 and 7.4 respectively for a total of 54.2.

When the graft copolymer prepared under (a) is used in a FL–2 engine test a sludge rating of 61.0 and a varnish rating of 11.7 are obtained. While this is a valuable improvement in engine cleanliness, the improvement obtained with the graft copolymer containing the amic acid units is even more marked.

The FL–2 engine test is conducted according to a procedure worked out by a committee of the Coordinating Research Council (C.R.C.) for the study of fuels and oils. A six-cylinder Chevrolet engine is operated at constant load and speed for 40 hours with a given fuel and with the oil under examination. At the conclusion of the run the engine is disassembled and engine parts are rated for deposits of sludge and varnish. The maximum sum of ratings would be 100.

A 1.4% blend of the amic graft copolymer gives a marked decrease in deposits in the Panel Coker Test, the deposit on the plate amounting to 48 mg. while in a comparable test with 1.4% of the copolymer prepared under (a) the deposit is 78 mg.

The Panel Coker Test is described in the record of the Fifth World Petroleum Congress (1959) in an article by R.M. Jolie, "Laboratory Screening Test for Lubricating Oil, Detergents and Dispersants." A sample of a compound under test is dissolved in an oil containing 1% of a thermally unstable zinc dialkyldithiophosphate. The solution is placed in a heated sump and is splashed against a heated panel at 570° F. for two hours. Gain in weight of the panel is determined and compared with oil without the test compound.

The graft copolymer is also examined in the Sundstrand Pump Test for distillate fuel oils. In this test one liter of fuel oil containing 4 grams of synthetic sludge is treated with additive. The oil is circulated for an hour through a Sundstrand oil burner pump containing a 100 mesh strainer. The sludge deposit is collected and weighed (Osterhout and Schwindeman, Ing. Eng. Chem. 48, 1892 (1956).)

At 0.01 g. of copolymer in 100 ml. of fuel oil the test gave 13 mg. of sludge. Without copolymer the deposit is 210 mg.

EXAMPLE 2

(a) The apparatus and method described in detail in Example 1a are used with a starting mixture of 90 parts of cetyl-stearyl methacrylate, 122 parts of 98% lauryl-myristyl methacrylate, 15 parts of white mineral oil, and 1.5 parts of a 50% solution of diisopropylbenzene hydroperoxide to which is added 0.3 part of the same 25% quaternary ammonium salt solution. After polymerization is carried to 73% at 105° C., a solution of 4.5 parts of maleic anhydride in 85.5 parts of ethyl acrylate is added together with more initiator and activator. The product after 7 hours of polymerization and stripping at 145° C./5 mm. is a 42.4% solution of graft copolymer, which has a viscosity of 3,536 cs. at 210° F.

(b) There are mixed 200 parts of the above concentrate and 2 parts of N-β-aminoethylethyleneurea, 1-(2-aminoethyl)-2-imidazolidinone. The mixture is heated with stirring for five hours at 120° C. The product is a 43% solution of graft copolymer in which the base polymer carries units grafted thereon of the amic acid formed with the aminoethylethyleneurea. The bulk viscosity is about 5,100 cs. at 210° F.

(c) A 1% blend of this graft copolymer is prepared in 170 neutral oil. It has viscosities of 7.72 cs. at 210° F. and 55.4 cs. at 100° F., giving a visocosity index of 112.

In the asphaltenes test the reacted graft copolymer is effective at 0.125% at both 90° and 150° C. against 0.2% of asphaltenes and at 0.25% at 150° C. against 0.4% of asphaltenes.

In a 100 S.U.S. neutral oil 1% of this graft copolymer depresses the pour point from 5° F. to −25° F.

In the Sundstrand Pump Test in fuel oil 0.01 g. of copolymer in 100 ml. of oil the weight of sludge is 41 mg. while the oil without additive gives 210 mg.

EXAMPLE 3

(a) The procedure of Example 2 is followed with substitution of azobisisobutyronitrile for the hydroperoxide and activator and control of temperature at about 90° C. The product is a 30% solution of graft copolymer in which maleic anhydride units are grafted onto the base polymer of methacrylate and acrylate esters. The solution has a viscosity of 264 cs. at 210° F.

(b) There are mixed 94.5 parts of this 30% graft copolymer solution in oil and 0.66 part of N-β-aminoethylethyleneurea. The mixture is heated for four hours with stirring at 120°–125° C. The anhydride units are practically quantitatively converted to amic acid units. The bulk viscosity of this reacted copolymer in about 30% solution is 350 cs. at 210° F.

(c) A 1% blend of the graft copolymer is made in 170 neutral oil. It has viscosities of 6.84 cs. at 210° F. and 43.56 cs. at 100° F., corresponding to a viscosity index of 121.

In the asphaltenes test dispersion of 0.2% of asphaltenes is obtained at 0.25% of copolymer at both 90° and 150° C. With 0.4% of asphaltenes dispersion at 150° is found with 0.5% of copolymer. Before amidation the copolymer of (a) requires 0.5% with 0.2% of asphaltenes at 150° C. and 1% with 0.4% of asphaltenes.

The pour point of blend in the 100 neutral oil is depressed from 5° F. to −20° F.

EXAMPLE 4

(a) The procedure of Example 2a and 3 is followed but with use of di-tert-butyl peroxide as catalyst and with temperatures at 110°–115° C. The product is a solution in oil containing 30% of graft copolymer. It has a viscosity of 3,230 cs. at 210° F.

(b) There are mixed 109.3 parts of this solution of graft copolymer and 0.66 part of N-β-aminoethylethyleneurea. The mixture is heated at 120° for 4 hours to give a graft copolymer in which the base polymer carries the substituted amic acid groups. The oil solution is adjusted to contain 30% of graft copolymer. The bulk viscosity is about 4,000 cs. at 210° F.

(c) A blend of this concentrate is made in lubricating oil and examined in the standard asphaltenes test. At 90° and 150° C. a blend of this graft copolymer disperses 0.2% of asphaltenes. At 150° C. 0.5% of this copolymer disperses 0.4% of asphaltenes.

EXAMPLE 5

(a) The procedure of Example 2a to 4a is followed but with substitution of benzoyl peroxide for the above catalysts and use of temperatures of 81°–101° C. The product is a 30% solution of graft copolymer having a viscosity at 210° F. of 1,643 cs.

(b) A mixture of 98.4 parts of this copolymer in oil and 0.66 part of N-β-aminoethylethyleneurea is stirred and heated at 120° C. for 4 hours to give a graft copolymer, carrying amic acid groups. The concentration of this copolymer is adjusted to 30% with additional oil. The bulk viscosity is about 1,950 cs. at 210° F.

(c) In the standard asphaltenes test a blend containing 0.25% of this copolymer disperses 0.2% of asphaltenes at both 90° and 150° C., while 0.4% of asphaltenes is dispersed at 150° by 0.5% of this copolymer.

EXAMPLE 6

(a) A mixture of 153.5 parts of cetyl-stearyl methacrylate of 97.8% purity, 84.4 parts of lauryl-myristyl methacrylate of 97.7% purity, 25 parts of methyl methacrylate, and 15 parts of white mineral oil is polymerized with diisopropylbenzene hydroperoxide as initiator and isooctylcresoxyethoxyethyldimethylbenzylammonium chloride as activator in accordance with the procedure described in Example 1a. After 80% of the starting mixture has formed polymer, there is added a mixture of 4.5 parts of maleic anhydride, 13 parts of lauryl methacrylate and 24.5 parts of methyl methacrylate together with initiator and activator. Temperatures in the first five hours are 105°–110° C. and about 100° C. for the last 2.5 hours. The product is diluted with oil and contains 30% of graft copolymer. This solution has a viscosity of 1,452 cs. at 210° F.

(b) A mixture of 141.6 parts of the above graft copolymer solution and 1.32 parts of aminoethylethyleneurea is heated at 150° C. for four hours to give a graft copolymer carrying amic acid groups. The concentration of copolymer is adjusted with oil to about 30%. The bulk viscosity of this concentrate is about 2,000 cs. at 210° F.

(c) In the standard asphaltenes test a blend containing 0.25% of copylmer disperses 0.2% of asphaltenes at 90° and 150° C., while 0.4% of asphaltenes is dispersed at 150° C. by 0.5% of this copolymer.

The pour point of a 1% solution of the copolymer in 100 neutral oil is −5° F.

EXAMPLE 7

(a) The procedure of Example 1a is followed with substitution of 81 parts of butyl acrylate for the methyl acrylate. The product is a 30% solution of graft polymer in oil which has a viscosity of 216.5 cs. at 210° F.

(b) A mixture of 207.2 parts of this solution and 2.64 parts of N-β-aminoethylethyleneurea is heated at 120°–130° C. for four hours to give a solution of graft copolymer carrying amic acid groups. The solution at 30% of copolymer has a viscosity of 328 cs. at 210° F.

(c) A 1% blend of this graft copolymer in 170 neutral oil has viscosities of 6.62 cs. at 210° F. and 42.04 cs. at 100° F., corresponding to a viscosity index of 119.

In the standard asphaltenes test a blend containing 0.064% of the copolymer disperses 0.2% of asphaltenes at 90° and 150° C. A blend of 0.5% disperses 0.4% of asphaltenes at 150° C. There is a marked increase in dispersing action by forming amic acid groups in the base copolymer, for the copolymer of (a) requires 0.5% of it to disperse 0.2% of asphaltenes at 90° C.

A 1% blend in 100 neutral oil has a pour point of −20° F., a depression of 25° F.

EXAMPLE 8

(a) The procedure of Example 1a is followed with a starting mixture comprising 90 parts of cetyl-stearyl methacrylate, 120 parts of lauryl-myristyl methacrylate, and 15 parts of styrene in oil, cumene hydroperoxide being used as initiator and didodecenyldimethylammonium chloride as activator. The base polymer is grafted with maleic anhydride units from addition of 9 parts of maleic anhydride in 66 parts of ethyl acrylate. At 30% of graft copolymer in oil the product has a viscosity of 429 cs. at 210° F.

(b) A mixture of 120 parts of this solution is heated at 140° C. for three hours with 1.32 parts of N-β-aminoethylethyleneurea to give a graft copolymer with amic acid groups. A concentrate with 30% of this copolymer has a viscosity of 762 cs. at 210° F.

(c) A 1% blend in 170 neutral oil gives viscosities of 6.99 cs. at 210° F. and 44.7 cs. at 100° F., corresponding to a viscosity index of 122.

In the standard asphaltenes test there is required only 0.063% of this copolymer to disperse 0.2% of asphaltenes at 90° C. and 150° C., while 0.4% of asphaltenes is dispersed by 0.25% at 150° C. This is a considerable improvement over the copolymer of (a), which requires 0.125% to disperse 0.2% of asphaltenes at 90° C. and 0.5% at 150° C.

A 1% blend in 100 neutral oil has a pour point of −25° F., a depression of 30° F.

EXAMPLE 9

(a) By the above procedure there is first polymerized to an extent of 72% a mixture containing 210 parts of cetyl-stearyl methacrylate, 285 parts of lauryl-myristyl methacrylate, 90 parts of ethyl acrylate, and 35 parts of oil. Then a mixture of 14 parts of maleic anhydride, 92 parts of ethyl acrylate, and 14 parts of N-vinyl-2-pyrrolidinone is copolymerized therewith. The product is a 30% solution of graft copolymer in oil having a viscosity of 394 cs. at 210° F.

(b) A mixture of 84.2 parts of the oil solution and 0.66 part of β-aminoethylethyleneurea is heated at 130° C. for four hours to give a graft copolymer carrying amic acid units. A 30% concentrate of this in oil has a viscosity of about 2700 cs. at 210° F.

(c) A 1% blend of this copolymer in 170 neutral oil has viscosities of 6.93 cs. at 210° F. and 48.45 cs. at 100° F., corresponding to a viscosity index of 108.

In the standard asphaltenes test, 0.063% of copolymer disperses 0.2% of asphaltenes at 90° and 150° C., while a 0.125% blend disperses 0.4% of asphaltenes at 150° C.

A 1% blend in 100 neutral oil depresses the pour point 20° F.

In the Sundstrand Pump Test, the sludge found is 12 mg. versus 210 mg. from the oil without this additive.

EXAMPLE 10

(a) The same procedure is applied to a mixture of 153.2 parts of cetyl-stearyl methacrylate, 96.7 parts of lauryl-myristyl methacrylate, and 15 parts of white mineral oil with diisopropylbenzene hydroperoxide being used as the initiator and diisobutylphenoxyethoxyethyldimethylbenzylammonium chloride as the activator. After initial base polymer has formed, there is added a mixture of 45 parts of methyl methacrylate and 10.2 parts of itaconic anhydride together with more initiator and activator. Copolymerization is continued for seven hours as above. The product is a 38.5% solution of graft copolymer in oil. It has a viscosity of 360.2 cs. at 210° F.

(b) There are mixed 111.8 parts of the above solution and 0.66 part of β-aminoethylethyleneurea. The mixture is stirred and heated at 120° C. for four hours. The resulting product in oil solution is filtered with the aid of a siliceous filter-aid. The resulting concentrate has a viscosity of 99 cs. at 210° F.

(c) In the standard asphaltenes test 0.063% of this copolymer disperses 0.2% of asphaltenes at 90° and 150° C.

A 1% blend in 100 neutral oil has a pour point of −15° F., a depression of 20° F.

A 1% blend in 170 neutral oil has viscosities of 6.38 cs. at 210° F. and 40.54 cs. at 100° F., corresponding to a viscosity index of 116.

EXAMPLE 11

(a) There is first polymerized a mixture of 30 parts of vinyl stearate and 5 parts of vinyl acetate in accordance with the above procedure. After 2¼ hours addition is made of 1.5 parts of maleic anhydride in 13.5 parts of ethyl acrylate. Toluene is used as a solvent and the same initiator and activator as in Example 10(a). Polymerization is continued for eight hours to give a 40.5% solution of graft copolymer. A 30% solution thereof in toluene has a viscosity of 62.1 cs. at 100° F.

(b) There are mixed 50 parts of the 40.5% solution of copolymer and 35 parts of 100 neutral oil. The mixture is stirred and heated with removal of volatile material.

The temperature is carried to 130° C. while the pressure is reduced to 5 mm. for an hour. Additional oil is supplied to give a solution of 30% of copolymer in oil.

A portion of 54.4 parts of this solution and 0.66 part of N-β-aminoethylethyleneurea are heated together at 120° C. for four hours, to form amic acid units. The resulting solution has a viscosity of 73.74 cs. at 210° F.

(c) A 1% blend in 170 neutral oil has viscosities of 5.98 cs. at 210° F. and 37.82 at 100° F., corresponding to a viscosity index of 112.

In the standard asphaltenes test 0.063% of copolymer disperses 0.2% of asphaltenes at 90° C. and 0.25% disperses 0.4% of asphaltenes at 150° C.

EXAMPLE 12

(a) There are first mixed and polymerized as above 90 parts of cetyl-stearyl methacrylate and 126 parts of isodecyl methacrylate in 15 parts of white mineral oil with diisopropylbenzene hydroperoxide as initiator and diisobutylphenoxyethoxyethyldimethylbenzylammonium chloride as activator. Between 2¼ and 3 hours after start of polymerization, there is added a solution of 9 parts of maleic anhydride in 75 parts of ethyl acrylate. More initiator and activator are supplied together with oil. The reaction mixture is heated after 7.5 hours to 135° C./5 mm. and diluted with 100 neutral oil to give a concentrate containing 30% of graft copolymer and having a viscosity of 432 cs. at 210° F.

(b) There are mixed 113.3 parts of this oil solution and 1.32 parts of N-β-aminoethylethyleneurea. The mixture is heated at 120° C. for 4 hours. The bulk viscosity is 1004 cs. at 210° F.

(c) A 1% blend has viscosities of 6.85 cs. at 210° F. and of 43.44 cs. at 100° F. corresponding to a viscosity index of 122. This blend is in 170 S.U.S. neutral oil.

A 1% blend in 100 neutral oil has a pour point of −45° F., a depression of 50° F.

In the standard asphaltenes test 0.063% disperses 0.2% of asphaltenes at 90° and 150° C. and of 0.4% at 150° C.

EXAMPLE 13

(a) The above procedure is followed starting with 35 parts of lauryl acrylate in 25 parts of toluene and continuing with a solution of 1.5 parts of maleic anhydride in 13.5 parts of ethyl acrylate. The resulting graft copolymer at 30% in toluene gives a viscosity of 19.5 cs. at 100° F. The copolymer is transferred to oil as above and adjusted to 30% of graft copolymer. The viscisity of this solution is 97.3 cs. at 210° F.

(b) A mixture of 40 parts of the oil solution and 0.53 part of N-β-aminoethylethyleneurea is heated for four hours at 120° C. to convert the maleic units to amic acid units. The bulk viscosity of the resulting solution is 176 cs. at 210° F.

(c) A 1% blend in 170 neutral oil had viscosities of 5.93 cs. at 210° F. and of 38.15 cs. at 100° F. corresponding to a V.I. of 109.

In the standard asphaltenes test 0.063% of copolymer disperses 0.2% of asphaltenes at 90° C. and 0.125% disperses 0.4% of asphaltenes at 150° C.

EXAMPLE 14

(a) In the same way there is first polymerized a mixture of 40 parts of cetyl-stearyl methacrylate, 10 parts of lauryl-myristyl methacrylate, and 12 parts of di-n-butyl itaconate. The catalyst is tert-butyl perbenzoate (0.588 part) and the solvent is toluene. After polymerization has been carried to about 80%, there is added a mixture of 3 parts of maleic anhydride and 35 parts of ethyl acrylate along with additional catalyst and solvent. There is obtained 36.9% solution of graft copolymer. At 30% in toluene this gives a viscosity of 1600 cs. at 100° F.

The copolymer is transferred as above to oil, volatile matter being stripped off at 130° C./5 mm. For convenience in handling this copolymer, the oil solution is adjusted to a 20% content of graft copolymer.

(b) A mixture of 131.8 parts of the 20% solution diluted with an equal weight of 100 S.U.S. neutral oil, and 1.32 parts of N-β-aminoethylethyleneurea is heated for four hours at 128° C. to give an amic acid sisubstituted copolymer.

(c) A 1% blend in 170 neutral oil has viscosities of 6.75 cs. at 210° F. and 41.77 cs. at 100° F. corresponding to a viscosity index of 124.

In the standard asphaltenes test a 0.063% solution of the copolymer disperses 0.2% of asphaltenes at 90° C., a 0.063% solution disperses 0.2% of asphaltenes at 150° C., and a 0.5% solution disperses 0.4% of asphaltenes at 150° C.

EXAMPLE 15

(a) The procedure of the above examples is followed with substitution of di-2-ethylhexyl sebacate for the white mineral oil. The weights of monomers are 90 parts of cetyl-stearyl methacrylate, 122 parts of lauryl-myristyl methacrylate of 98% purity, and 15 parts of the sebacate ester together with diisopropylbenzene hydroperoxide and the same quaternary ammonium salt used in Example 1(a) and in the same proportions and under the same conditions. The delayed addition of monomers comprises 9 parts of maleic anhydride and 81 parts of butyl acrylate. Enough additional di-2-ethylhexyl sebacate is supplied to provide 900 parts of the final solution of graft copolymer. At 30% of this copolymer, the solution has a viscosity of 85 cs. at 210° F. Analysis shows the presence of 2.94% of units from maleic anhydride, close to the theoretical value of 3%.

(b) There are mixed 220.2 parts of the 30% copolymer solution in diester and 2.64 parts of N-β-aminoethylethyleneurea. The mixture is heated at 120–130° C. for three hours. The resulting solution has a viscosity of 167 cs. at 210° F.

(c) A 1% blend of the above graft copolymer is made with additional di-2-ethylhexyl sebacate.

It has viscosities of 4.15 cs. at 210° F. and 15.20 cs. at 100° F. corresponding to a viscosity index of 196.

This blend readily disperses 0.2% of asphaltenes at 90° and 150° C.

EXAMPLE 16

(a) The procedure used in Example 15 is again followed, starting with 90 parts of cetyl-stearyl methacrylate, 120 parts of pure lauryl-myristyl methacrylate, and 15 parts of white mineral oil. The initiator system is the same as in Example 1. After initial polymerization there is added a mixture of 30 parts of maleic anhydride, 60 parts of normal butyl acrylate, and 30 parts of methyl ethyl ketone together with initiator, activator and oil, as before. The reaction mixture is stripped of volatile materials at 140° C./5 mm. to give a 30% solution having a viscosity of 103 cs. at 210° F.

(b) Portions of this copolymer solution are mixed with β-aminoethylethyleneurea (AEEU) in different ratios and heated at 120° C. for four hours, as summarized in Table I.

*Table I*

REACTION OF COPOLYMER AND AEEU

| Batch | Solution Wt. | AEEU Wt. | Mole Ratio* |
|---|---|---|---|
| 1 | 122.8 | 1.32 | 0.5 |
| 2 | 123.3 | 1.85 | 0.7 |
| 3 | 123.1 | 2.64 | 0.1 |
| 4 | 126.4 | 5.28 | 2.0 |

*The mole ratio is the ratio of AEEU to the maleic units found by actual analysis.

The resulting batches have the following bulk viscosities: 1,186 cs.; 2,256 cs.; 3,490 cs.; and 4, above 2,000 cs.—all at 210° F.

(c) All of the above batches disperse asphaltenes in the standard test. At 0.2% of asphaltenes, 0.063% is sufficient to do so at 90° C. and 150° C. With 0.4% of asphaltenes at 150° C., Batches 1 and 2 at 0.25%, Batch 3 at 0.125%, and Batch 4 at 0.063% gave required dispersion.

The 1% blends of these batches had V.I. values of 118, 119, 117, and 130 respectively.

EXAMPLE 17

(a) There are polymerized cetyl-stearyl methacrylate and lauryl-myristyl methacrylate in a weight ratio of 30:40 in white mineral oil as in Example 1(a). Then there is supplied and copolymerized a solution of maleic anhydride in butyl acrylate in a weight ratio of 3:27. The product is a solution of graft copolymer with a viscosity of 151 cs. at 210° F. with 30% of copolymer.

(b) To a portion of 778 parts of the above oil solution of graft copolymer there is added 7.88 parts of N-β-aminoethylethyleneurea. The mixture is heated at 120° C. for four hours to give a graft copolymer having amic acid groups. It has a viscosity of 296 cs. at 210° F.

(b1) A mixture of 129.7 parts of the above solution of graft copolymer from (a) and 1.57 parts of 1-(3-aminopropyl)-2-hexahydropyrimidinone is made at 55° C. with addition of 8 parts of methyl ethyl ketone. The solution is stirred and heated at 120° C. for four hours. The reaction product is stripped at 130° C./5 mm. for an hour. There results 130 parts of an oil solution of graft copolymer containing amic acid units bearing the group

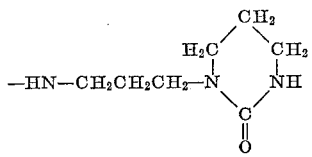

The bulk viscosity of this solution is 783 cs. at 210° F.

(b2) A mixture of 130 parts of the copolymer from (a) and 1.58 parts of 1-(1-methyl-2-aminoethyl)-5-methylethyleneurea and 10 parts of methyl ethyl ketone is stirred and heated up to 130° for four hours. The reaction product is stripped by reducing the pressure to 5 mm. The resulting graft copolymer has amic units bearing the group

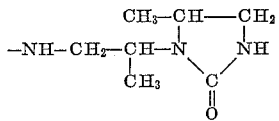

The bulk viscosity is 532 cs. at 210° F.

(c) A 1% blend of the copolymer from (b) has viscosities of 6.98 cs. at 210° F. and 44.31 cs. at 100° F., corresponding to a viscosity index of 123.

A blend of 0.063% in oil disperses 0.2% of asphaltenes at 90° C. and 0.125% of asphaltenes at 150° C. At 0.4% of asphaltenes 0.125% likewise gives dispersion.

(c1) A 1% blend of the copolymer from (b1) in 100 neutral oil has viscosities of 7.08 cs. at 210° F. and 44.08 cs. at 100° F., corresponding to a viscosity index of 126.

In the standard asphaltenes dispersancy test, 0.063% of copolymer disperses 0.2% of asphaltenes at 90° C., 0.063% of copolymer disperses 0.2% of asphaltenes at 150° C., and 0.025% of copolymer disperses 0.4% of asphaltenes at 150° C.

(c2) A 1% blend in 100 neutral oil of the graft copolymer from (b2) has viscosities of 6.81 cs. at 210° F. and 43.52 cs. at 100° F., corresponding to a viscosity index of 120.

In the standard asphaltenes test 0.063% of copolymer disperses 0.2% of asphaltenes at 90° C., 0.063% of copolymer disperses 0.2% of asphaltenes at 150° C., and 0.25% of copolymer disperses 0.4% of asphaltenes at 150° C.

We claim:

1. A composition comprising a major amount of an oil selected from the class consisting of a lubricating oil and a fuel oil having dissolved therein a minor proportion sufficient to impart detergency of a graft copolymer having a base polymer of at least one ester from the class consisting of alkyl acrylates and alkyl methacrylates, the alkyl portion of which has a size sufficient to provide solubility of the graft copolymer in oils, said base polymer carrying units grafted thereon of an amic acid from the class consisting of maleamic and itaconamic acids in which the nitrogen of the amic acid units carries the group

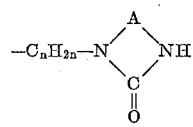

wherein $n$ is an integer from two to three and A is an alkylene group of two to three carbon atoms, the amic acid units being about 1% to 22% of the weight of the graft copolymer.

2. A composition comprising a major amount of a lubricating oil having dissolved therein from about 0.1% to 10% of a graft copolymer having a base polymer of at least one ester from the class consisting of alkyl acrylates and alkyl methacrylates, the alkyl portion of which has a size sufficient to provide solubility of the graft copolymer in said lubricating oil and having carbon atoms of average size of at least eight, said base polymer carrying units grafted thereon of an amic acid from the class consisting of maleamic and itaconamic acids in which the nitrogen of the amic acid units carries the group.

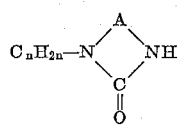

wherein $n$ is an integer from two to three and A is an alkylene group of two to three carbon atoms, the amic acid units being about 2% to 11% by weight of the graft copolymer.

3. A composition comprising a major amount of a fuel oil having dissolved therein from about 0.001% to about 0.1% of a graft copolymer having a base polymer of at least one ester from the class consisting of alkyl acrylates and alkyl methacrylates, the alkyl portion of which has a size sufficient to provide solubility of the graft copolymer in said lubricating oil and having an average size of at least eight carbon atoms, said base polymer carrying units grafted thereon of an amic acid from the class consisting of maleamic and itaconamic acids in which the nitrogen of the amic acid units carries the group

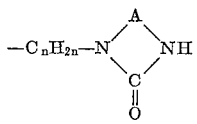

wherein $n$ is an integer from two to three and A is an alkylene group of two to three carbon atoms, the amic acid units being about 2% to 11% by weight of the graft copolymer.

4. A composition comprising a major amount of an oil selected from the class consisting of a lubricating oil and a fuel oil having dissolved therein a minor proportion sufficient to impart detergency of a graft copolymer having a base polymer of at least one ester from the class consisting of alkyl acrylates and alkyl methacrylates, the alkyl portion of which has a size sufficient to provide solubility of the graft copolymer in oils, and a minor proportion with respect to said base polymer of at least one other polymerizable monovinylidene compound, said base polymer carrying units grafted thereon of an amic acid from the class consisting of maleamic and itaconamic acids in which the nitrogen of the amic acid units carries the group

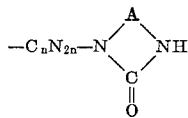

wherein $n$ is an integer from two to three and A is an alkylene group of two to three carbon atoms, the amic acid units being about 1% to 22% of the weight of the graft copolymer.

5. A composition comprising a major amount of an oil selected from the class consisting of a lubricating oil and a fuel oil having dissolved therein a minor proportion sufficient to impart detergency of a graft copolymer having a base polymer of at least one alkyl methacrylate, the alkyl portion of which has a size sufficient to provide solubility of the graft copolymer in oils and having an average size of at least eight carbon atoms, said base polymer carrying units grafted thereon of maleamic acid in which the amide nitrogen carries the group

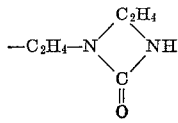

the said maleamic acid units being about 2% to 11% by weight of the graft copolymer.

6. A composition according to claim 5 in which the oil is a mineral lubricating oil having dissolved therein from about 0.1% to 10% by weight of said graft copolymer.

7. A composition according to claim 5 in which the oil is a synthetic lubricant having dissolved therein from about 0.1% to 10% by weight of said graft copolymer.

8. A composition according to claim 5 in which the oil is a combustible hydrocarbon fluid having dissolved therein about 0.001% to 0.1% by weight of said graft copolymer.

9. A composition according to claim 8 in which the combustible hydrocarbon fluid is gasoline.

10. A composition according to claim 8 in which the combustible hydrocarbon fluid is a fuel oil.

References Cited by the Examiner

UNITED STATES PATENTS 2,698,316   12/1954   Giammaria _____ 260—78
2,980,652   4/1961    Melamed et al. _____ 260—2 X DANIEL E. WYMAN, *Primary Examiner.*

PAUL M. COUGHLAN, *Examiner.*